United States Patent
Walter et al.

(10) Patent No.: US 11,440,747 B2
(45) Date of Patent: Sep. 13, 2022

(54) CONVEYOR WITH EJECTOR

(71) Applicant: Wipotec GmbH, Kaiserslautern (DE)

(72) Inventors: Markus Jochen Walter, Trippstadt (DE); Lukas Müller, Bann (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 17/171,441

(22) Filed: Feb. 9, 2021

(65) Prior Publication Data

US 2021/0245969 A1   Aug. 12, 2021

(30) Foreign Application Priority Data

Feb. 10, 2020 (DE) .................... 202020100680.0

(51) Int. Cl.
*B65G 47/82* (2006.01)
*B65G 43/08* (2006.01)
*B65G 47/52* (2006.01)

(52) U.S. Cl.
CPC ............ *B65G 47/82* (2013.01); *B65G 43/08* (2013.01); *B65G 47/525* (2013.01);
(Continued)

(58) Field of Classification Search
CPC ...... B65G 47/82; B65G 43/08; B65G 47/525; B65G 2203/041; B65G 2203/042
See application file for complete search history.

(56) References Cited

U.S. PATENT DOCUMENTS

| | | |
|---|---|---|
| 4,986,407 A | 1/1991 | Heuft |
| 5,979,635 A | 11/1999 | Calhoun |
| 6,822,181 B2 | 11/2004 | Linton |

FOREIGN PATENT DOCUMENTS

| | | | | |
|---|---|---|---|---|
| CN | 107931138 A | * | 4/2018 | |
| CN | 108193646 A | * | 6/2018 | ............... E02B 5/08 |

(Continued)

OTHER PUBLICATIONS

WIPOTEC Group: "Checkweighers in Modular Design", YouTube, Oct. 23, 2019, p. 2, found in internet: URL:https://www.https://www.youtube.com/watch?v=Qoa-fo8CRYQ, (Year: 2019).*

(Continued)

*Primary Examiner* — Gene O Crawford
*Assistant Examiner* — Lester Rushin, III
(74) *Attorney, Agent, or Firm* — The Culbertson Group, P.C.

(57) ABSTRACT

A belt conveyor is configured for conveying products in a conveying direction and defines a width extending in a transverse direction orthogonal to the conveying direction, and a height direction orthogonal to the conveying and transverse directions. An ejector is fixed to the belt conveyor and acts in the transverse direction for sorting out/discharging products. The ejector has an end region which faces the product to be sorted out, and has a base body mounted in a base position on the belt conveyor by means of a holder. The basic position of the base body can be adjusted by means of an adjusting device of the holder in the transverse direction within an adjustment path so that the end area of the non-actuated ejector in the transverse direction can protrude across the belt conveyor width by at least half of that width, or more.

18 Claims, 6 Drawing Sheets

(52) U.S. Cl.
CPC ............... *B65G 2203/0233* (2013.01); *B65G 2203/041* (2013.01); *B65G 2203/044* (2013.01)

(56) References Cited

FOREIGN PATENT DOCUMENTS

| | | | |
|---|---|---|---|
| DE | 37 11 605 A | | 10/1988 |
| DE | 3910567 A1 | | 4/1990 |
| JP | 200334424 A | | 2/2003 |
| JP | 2014 105073 A | | 6/2014 |
| JP | 2014105073 A | * | 6/2014 |
| WO | 2018108390 A1 | | 6/2018 |

OTHER PUBLICATIONS

Search report dated Nov. 2, 2020 by the German Patent Office in DE 20 2020 100 680.0 with English language translation.
European Extended Search Report in EP 21156014.9, dated Jul. 6, 2021.
WIPOTEC Group: "Checkweighers in Modular Design", Youtube, Oct. 23, 2019 (Oct. 23, 2019), p. 2 et seq., XP054981933, found in the Internet: URL:https://www.youtube.com/watch?V=BiGuuWOYI2Y&list=TLGGIvOnyIdVa5QyMTA2MjAyMQ&t=192s [found on Jun. 21, 2021].
Japan Patent Office action in JP 2021-016636 dated Apr. 8, 2022.

* cited by examiner

CONVEYOR WITH EJECTOR

TECHNICAL FIELD OF THE INVENTION

The invention concerns conveyors for transporting products in a transport direction and having an ejector acting in the direction transverse to the transport direction in order to sort or divert products.

BACKGROUND OF THE INVENTION

Conveyors are used, for example, in production lines in the manufacture, testing, and control of packages or products, in order to automatically sort or divert from the product flow items that have been determined to be nonconforming.

In this case, various kinds of sorting systems with various modes of operation can be used to sort products, for example, air blast nozzles, sorting gates, sorting paddles, or even sliders or pushers.

Sliders or pushers usually use a pneumatic piston and cylinder device as the actuator, on which is mounted a pusher plate, which ejects the product upon extension of the piston and cylinder device across the direction of the product flow.

The product flow is mostly realized via a conveyor which has a width that is transverse to the transport direction. On the conveyor, products of different sizes can be transported along different transverse positions, wherein typically no product projects laterally beyond the width of the conveyor.

In the meaning of the invention below, the term "conveyor" is understood to mean any conveyor defining a transport surface for transport of products, regardless of whether the transport surface is formed from a belt, a plurality of parallel or even overlapping belts, rollers, chutes, slide plates, roller tracks, chains, plate/chain belts, etc.

If one wishes to cover the entire diversity of the possible product flow with a sorting pusher, the maximum displacement of the pusher plate in the transverse direction must correspond to the width of the conveyor belt.

If the product flow that is actually present does not, because of a variation of its width, utilize the entire width of the transport surface, the sorting pusher gives up valuable time (travel path) before it has traveled up to the contact position. The same thing is true for the return travel. Because of this, the throughput of the entire sorting system is disadvantageously reduced.

Since the piston and cylinder device must extend out to its maximum stroke for the pusher plate to reach and divert the products, the device impedes the product flow until it has completely reached its starting position again. The throughput is reduced by this.

Moreover, the maximally required stroke of the piston and cylinder device specifies a minimum length of the piston rod, which increases the area required in the transverse direction. In the retracted position, the piston rod then projects problematically across the transport direction of the belt conveyor and presents a risk of accident. Also, the projecting rod can become accidentally damaged.

If one wishes to cover the entire diversity of the possible product flow with an air blast nozzle, the air pressure generated at the exit orifice (at the nozzle) must have an appropriate force to divert even products that are maximally far away (in the region of the opposite edge of the belt). This increases the (reaction) time up to ejection of a product, so that the throughput is correspondingly reduced. Moreover, the required pressure increases and gives rise to increased noise generation (up to a loud bang), which is perceived as disruptive in a working process.

SUMMARY OF THE INVENTION

An object of the present invention is to provide a conveyor and sorter/ejector that eliminates the above disadvantages and other, and in a simple way increases the throughput, reduces the size (transverse to the transport surface) and decreases the danger of damage to the conveyor or sorter/ejector as well as adverse effects or even injuries to operating personnel.

A conveyor according to the invention provides a transport surface along which products are transported in a transport direction x, and an ejector arranged on the conveyor and acting in the transverse direction y to the transport surface for diverting or ejecting products. The ejector includes an end region which is turned toward, that is, faces the product to be sorted.

The ejector has a base body which is fixed in a base position relative to the conveyor, preferably on the conveyor, by means of a mounting bracket. In accordance with the present invention, the base position of the base body can be adjusted in the y direction within an adjustment path and secured there by means of an adjusting device of the mounting bracket, so that the end region of the unactuated ejector (for example, a piston/cylinder-type actuator in its retracted condition) can project into the belt in the y direction by at least up to half, preferably by two-thirds, or, most preferably, by the entire width of the conveyor.

Moreover, the length, or depth, of the base body of the ejector in the y direction is considerably smaller than the width of the conveyor, preferably a maximum three-fourths, two-thirds, one-half, one-third, or one-fourth of the width of the belt conveyor.

Through this mounting bracket and adjusting device arrangement it is advantageously possible—in the case of a product flow that does not use the entire transport surface width—to move the ejector in the y direction into the area of the transport surface in its base position (and thus its end region) and in this way to reduce the distance between the end region of the unactuated ejector and the products of a product flow. The reduced distance advantageously brings about faster sorting (shorter reaction time) and thus enables higher throughput in product processing.

For example, the required stroke is reduced in the case of an ejector with a movable end region (sorting gate, sorting paddle, or also slider or pusher).

In the case of an ejector with an end region fixed in place relative to the base body, for example one made as an air blast nozzle, a shorter distance to a product flow advantageously reduces the reaction time (of the ejection operation). Moreover, the shorter distance allows a reduction of the pressure that is to be used and contributes to a reduction of noise generation.

In some embodiments of the invention, the ejector is made as a slider, pusher, or the like with a movable end region acting in the transverse direction y. Upon actuation, the end region can move between its retracted starting position and its traveled end position (stroke). Through the adjustability of the base position of the base body in accordance with the invention it is possible to set a starting position of the end region that lies significantly within the width of the transport surface of the conveyor in the y direction.

In the case of an ejector with a movable end region, the required design-related maximum stroke is considerably reduced through this (for example, by a fourth, third, or half of the belt width), so that the required maximum extension (dimension or depth) of the ejector in the y direction also comes out to be considerably less.

Moreover, according to the invention, the maximum projection of a piston rod (in the y direction) of a piston and cylinder-type actuator is reduced in the case of a slider or pusher, so that the risk of damage to the rod and injury to an operator is reduced.

In an especially advantageous embodiment of the invention, the ejector is designed as a short stroke pusher. In this case the space required in the y direction can be kept particularly small. Such a short stroke pusher is configured to exert an impulse that is sufficient to move (push) a product (depending on product parameters such as type, weight, surface area, surface properties, coefficient of friction between product surface and transport surface while overcoming static friction) over the entire width of the transport surface (component of motion in the y direction) and thus to divert it.

In other embodiments of the invention, the adjusting device is designed as at least a two-stage device, for example as a telescoping pullout device, so that the dimension of the adjusting device in the y direction is less than the maximum adjustment path, that is, the maximum adjustment range or length. This likewise advantageously contributes to a reduction of the space required in the y direction.

The adjusting device can, in some embodiments of the invention, be composed, for example, of at least two separate devices aimed in the y direction and preferably parallel to each other, wherein the adjustment path is the sum of the partial adjustment paths.

In some embodiments of the invention, the ejector is designed as a stroke sorter or pusher, wherein at least a part of the adjusting device (for example the guide) is made as an air conducting element with an exit orifice (preferably an exchangeable nozzle), i.e., as an air blast nozzle. This can, for example, also enable products that are still in the production section to be blown off by a permanent air flow, which is often necessary when the conveyor starts (transport surface clearing), without having to provide an otherwise necessary separate air blast nozzle.

In the case of an at least two-stage adjusting device, the part of the adjusting device made as an air blast nozzle can additionally be designed to be adjustable and securable in the y direction.

In other embodiments of the invention, the adjusting device has a position device, for example a scale, sensor, path measurement device, etc., by means of which the current base position can be detected or adjusted and preferably marked. Marking in the meaning of the invention is also understood to mean a storing (and retrieval) of the corresponding position data.

In these embodiments including a position device, it is also conceivable that, if necessary, for example if there is a change of product, a predefined, for example stored or computed, base position will automatically be taken.

In some embodiments of the invention, the position device is designed so that the base positions can be set and/or checked and/or determined and/or displayed automatically by themselves (thus without the manual intervention of an operator), wherein of course a semiautomatic adjustment directly at the adjusting device or indirectly via an operator program is also conceivable. In these embodiments, the base position of the base body may be automatically adjusted in the y direction in dependence on a product position detected by means of a sensor device, for example photoelectric barrier(s), proximity detector, camera, for example for each individual product or a group or batch of products.

These and other advantages and features of the invention will be apparent from the following description of representative embodiments, considered along with the accompanying drawings.

DESCRIPTION OF REPRESENTATIVE EMBODIMENTS

Figure 1:
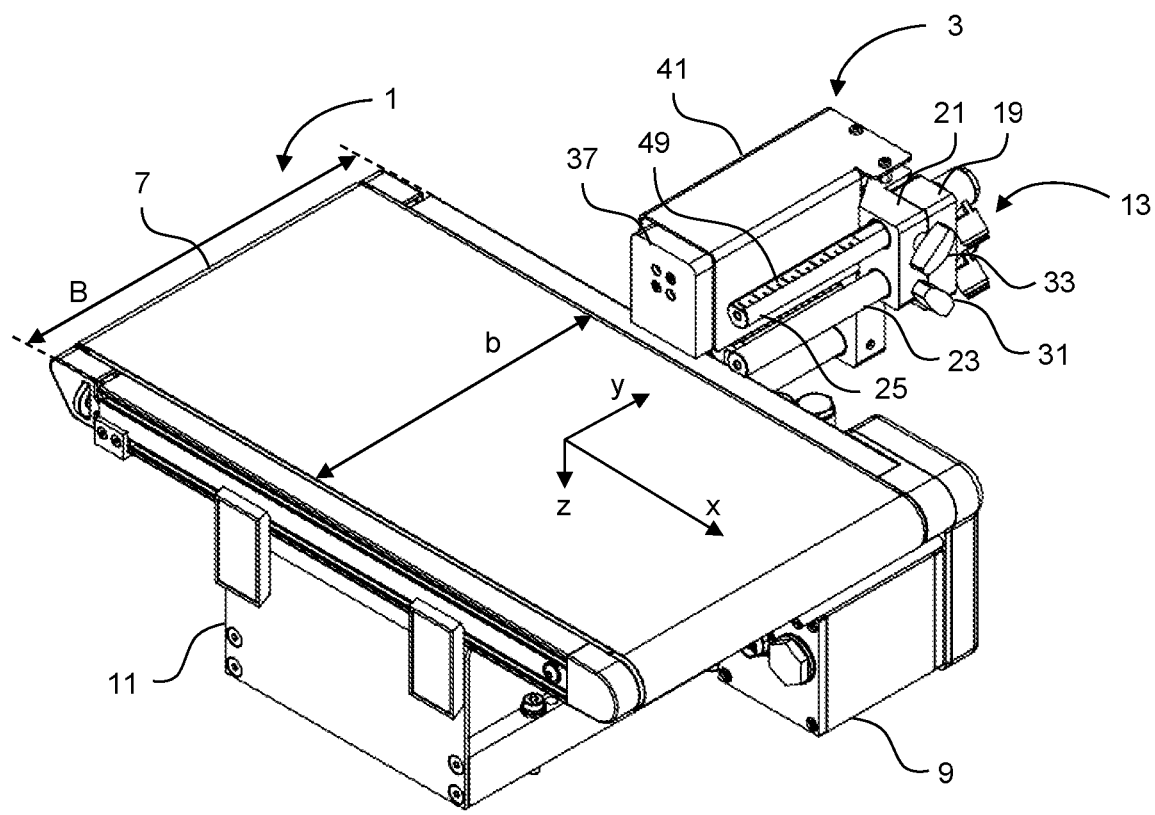
FIG. 1 shows a perspective front view of a belt conveyor in accordance with the invention with an ejector in a first base position.

The conveyor 1 shown in FIG. 1, in this example a belt conveyor, comprises a frame 11 and a transport surface provided by a belt 7, which is guided over rollers (not shown in the drawing) at the left and right ends and driven in transport direction x by a motor 9 disposed on frame 11.

The belt conveyor 1 has a width B in the y direction transverse to the transport direction x. The belt 7 of the belt conveyor 1 lies within this width B, with a front and rear edge, so that the belt 7 has a correspondingly smaller width b.

At the rear side of the belt conveyor 1, approximately in the middle (in the x direction) region, an ejector in the form of a short stroke pusher 3 is mounted on the frame 11 by means of a mounting bracket which includes an adjusting device 13.

As can be seen from FIGS. 2, 4, 6, 8, and in particular 9, the adjusting device 13 includes a first and a second guide members, in this case guide cylinders 15 and 17 extending in the y direction to the rear (or to the left in FIGS. 2, 4, 6, 8), which are fixed in place, for example bolted, on the frame 11.

The guide cylinders 15 and 17 extend through corresponding (guide) drillings located in a lower region of, for example, an S-shaped first adjustment element 19. (Wing) bolts 27 and 29, which can be screwed into the first adjustment element, are situated transverse to the guide cylinders 15 and 17 so as to apply a force or to secure the first adjustment element 19 on the guide cylinders 15 and 17 into a desired position.

Figure 9:
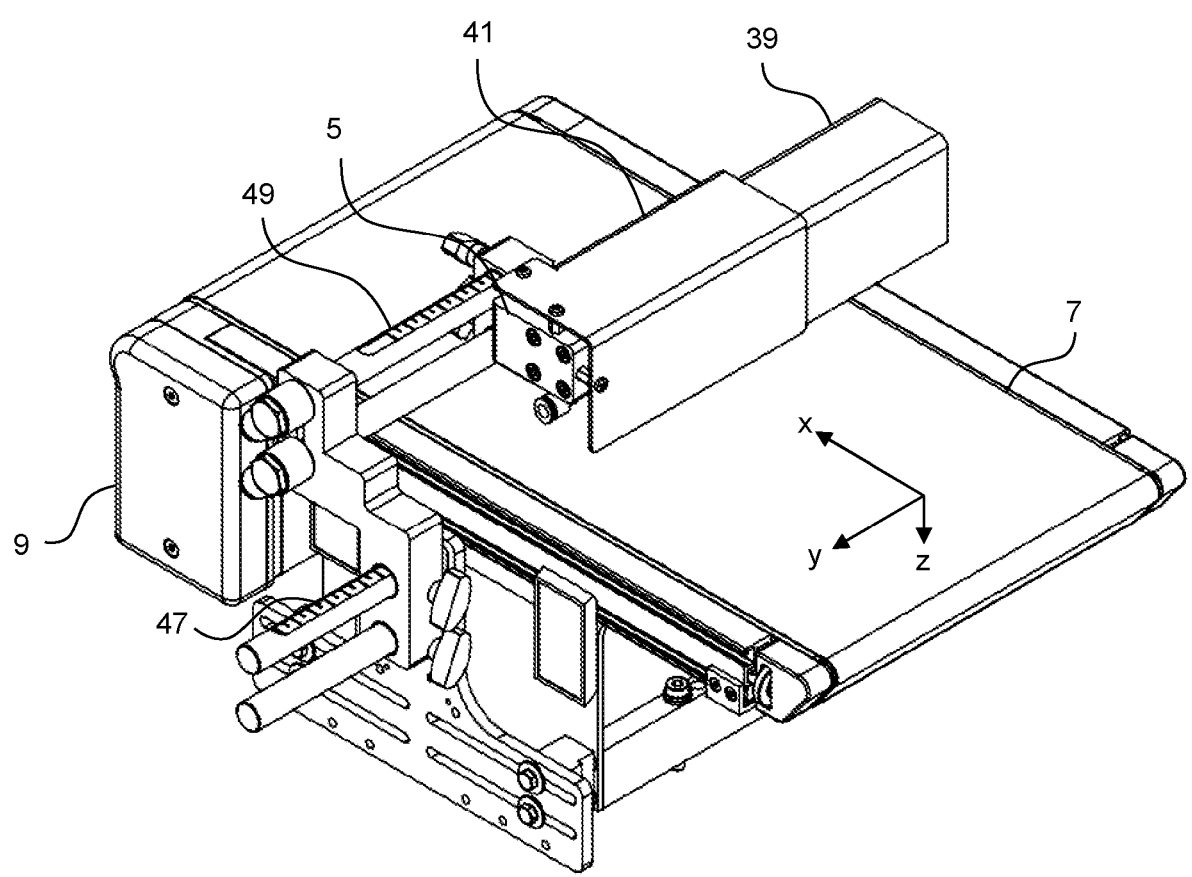
FIG. 9 shows a perspective rear view of the belt conveyor as in FIGS. 7 and 8.

As can be seen from FIG. 9, there is mounted on the second (upper) guide cylinder a scale 47, on which an adjusted position of the adjusting element 19 can be read.

In the upper region, likewise in the y direction, a third and a fourth guide elements comprising guide cylinders 23 and 25 are secured in place in the first adjustment element 18, for example bolted in place, and extend in the direction toward the belt conveyor 1.

The guide cylinders 23 and 25 extend through corresponding (guide) drillings of the second adjusting element 21, which is firmly affixed to a base body 5 (see FIG. 9) of the short stroke pusher 3. (Wing) bolts 31 and 33, which can be screwed into the second adjusting element 21, are arranged transversely to the guide cylinders 23 and 25 so as to apply a force or to secure the second adjusting element 21 and thus the short stroke pusher 3 on the guide cylinders 23 and 25 in a desired position.

As can be seen from FIGS. 1, 3, 5, 7, and 9, a scale 49, on which an adjusted position of the adjusting element 21 and thus the short stroke pusher 3 can be read, is likewise affixed to the fourth (upper) guide cylinder 25, similar to the second guide cylinder 17.

It will be appreciated that the reference numbers correspondingly apply in all of FIGS. 1-9, even though, for the sake of clarity, they are not shown in every figure.

The short stroke pusher has, at its front side (turned toward the products), an end region in the form of a pusher plate 37, which can be extended outward in the y direction onto the belt 7 (or products transported thereon) by means of a piston rod (not shown in the drawing) and a piston from a base body 5 made as a cylinder housing.

A first protective cover 39, which has a plan view that does not change over the length (in the y direction), extends from the pusher plate 37 in the direction of the base body 5, so that the protective cover 39 covers the piston rod and moves with the pusher plate 37.

A second protective cover 41, which together with the first protective cover 39 covers the cylinder housing above and on both sides even when the pusher plate 37 is extended, is affixed at short stroke pusher 3 on base body 5. In this way, gaps that may open and close are covered so that pinching, crushing, etc., of the fingers or hands of operating personnel is prevented.

Since the protective cover 39 must be made correspondingly longer (in the y direction) if the stroke is greater, the length of the protective cover 39 can also be advantageously reduced by the short length of the ejector according to the invention.

The pusher is preferably made as a short stroke pusher 3, which does not necessarily push products over the entire width for sorting, rather alternatively it strikes the product with an impulse and pushes the product out. Because of the reduction of the length of the protective cover 39, its moving mass (mass inertia) is also reduced, so that in the case of a pneumatic pusher, the required pressure and thus the resulting noise load can be reduced.

Figure 2:
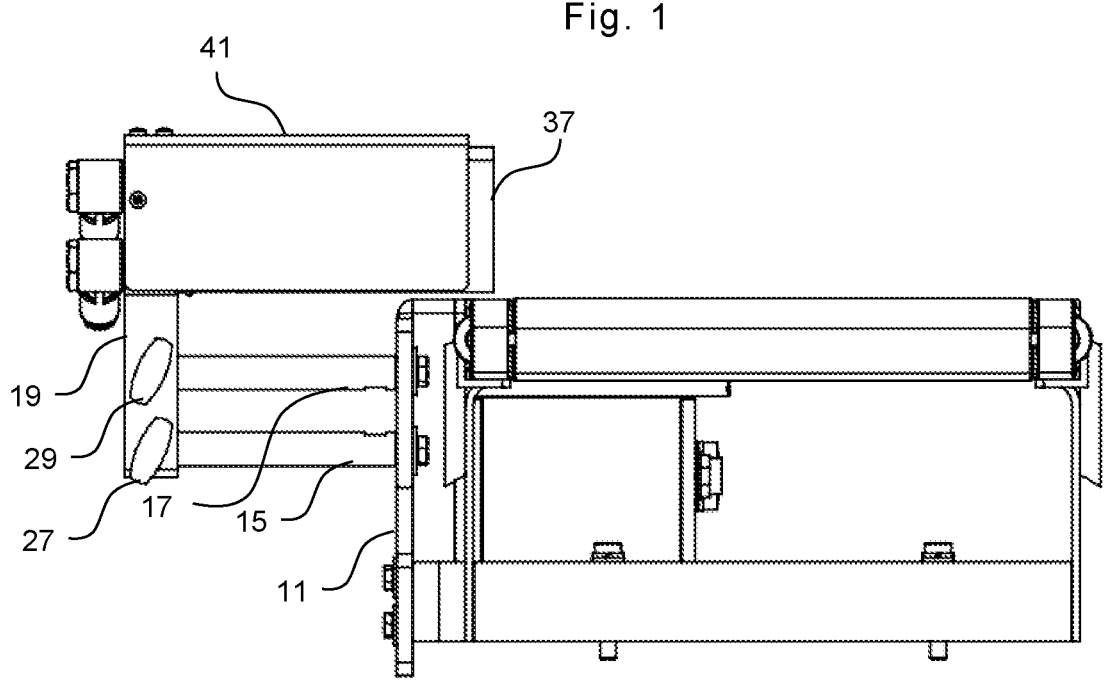
FIG. 2 shows a left side view of a belt conveyor as in FIG. 1.

In the first base position, which is shown in FIGS. 1 and 2, the base body 5 of the pusher 3 is situated so far outside the belt conveyor 1 that the pusher plate 37 in the unactuated state, thus the maximally retracted position, is only a little within the width B of the belt conveyor 1, but outside the width b of the belt 7.

Here, both adjusting elements 19 and 21 are in their maximally rearward (or leftward in FIG. 2) end position.

Figure 3:
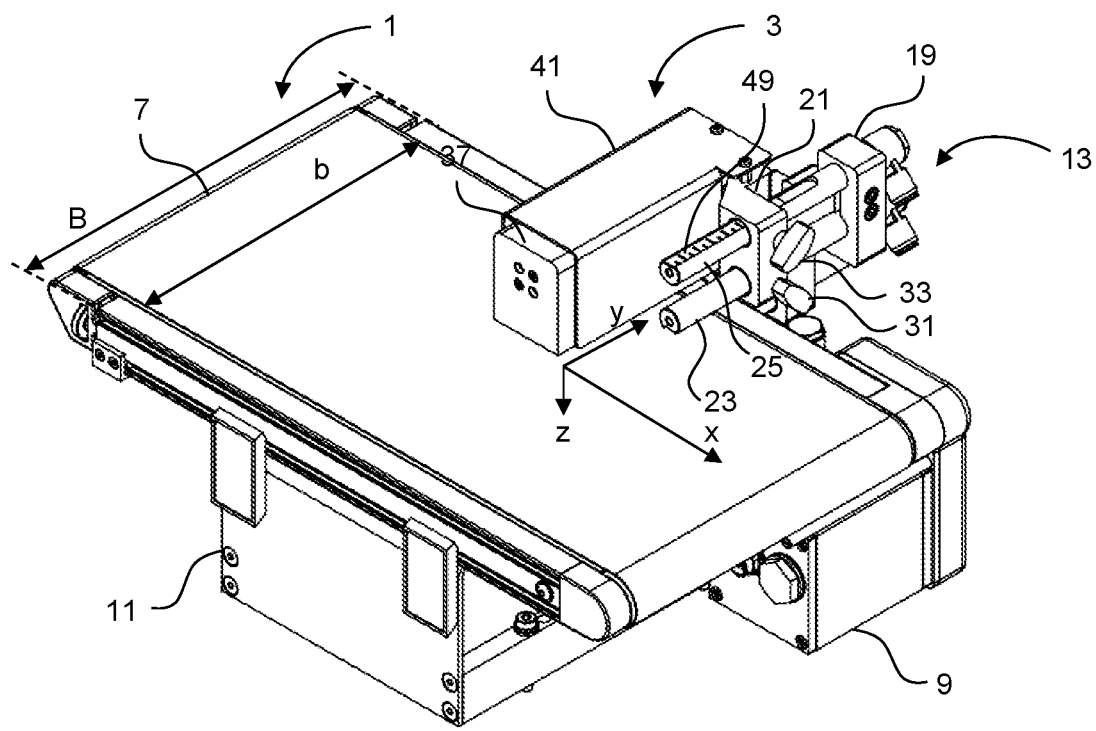
FIG. 3 shows a perspective front view of the belt conveyor according to the invention with an ejector in a second base position.
Figure 4:
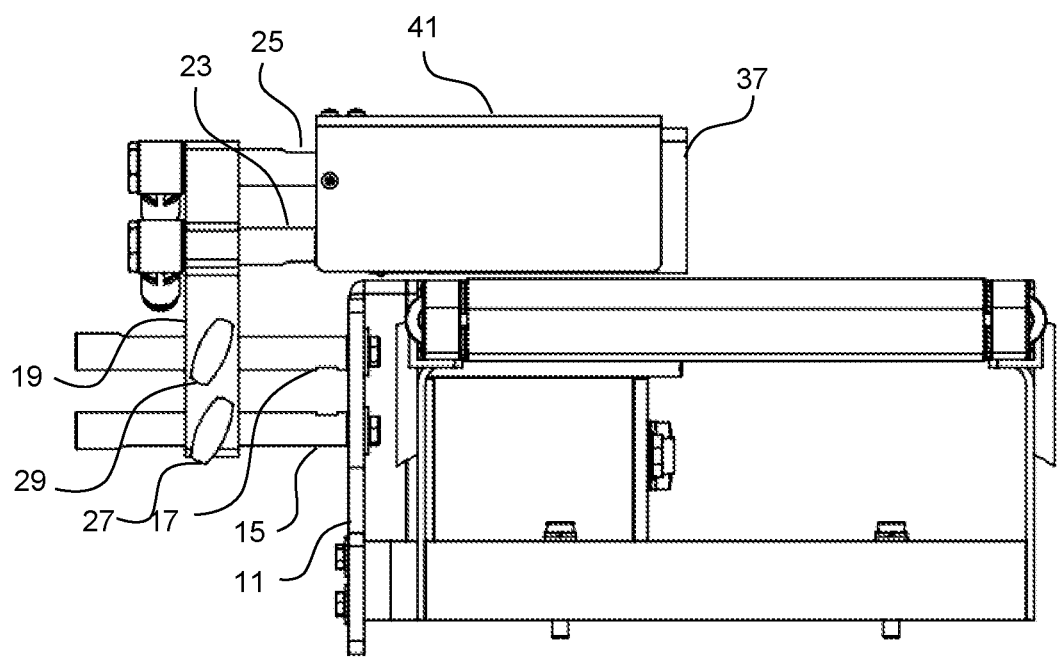
FIG. 4 shows a left side view of a belt conveyor as in FIG. 3.

In the second base position, which is shown in FIGS. 3 and 4, the base body of the pusher 3, in contrast, projects so far into the belt conveyor 1 that the pusher plate 37 in unactuated state projects up to nearly half of the width B of the belt conveyor 1 (and the width b of the belt 7) in the y direction.

In this second base position, which is shown in FIGS. 3 and 4, the adjusting elements 19 and 21 are each in the middle region of their scales or their adjustment ranges.

Figure 5:
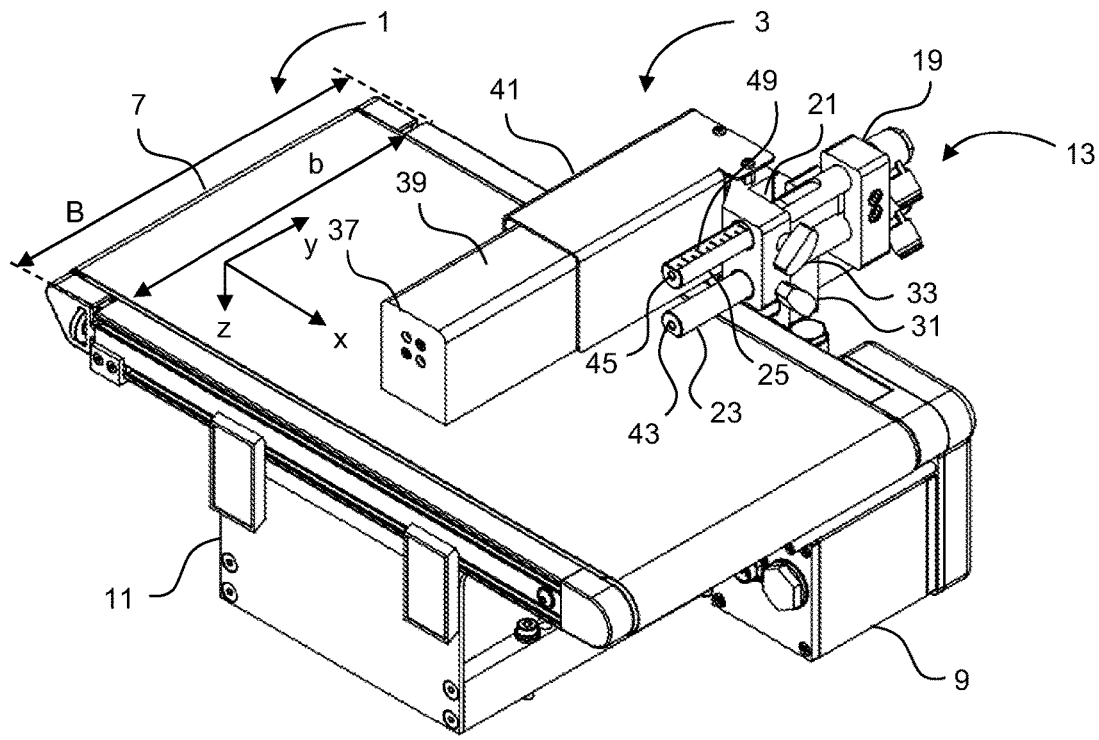
FIG. 5 shows a perspective front view of the belt conveyor according to the invention as in FIGS. 3 and 4 with an ejector with an extended end region.
Figure 6:
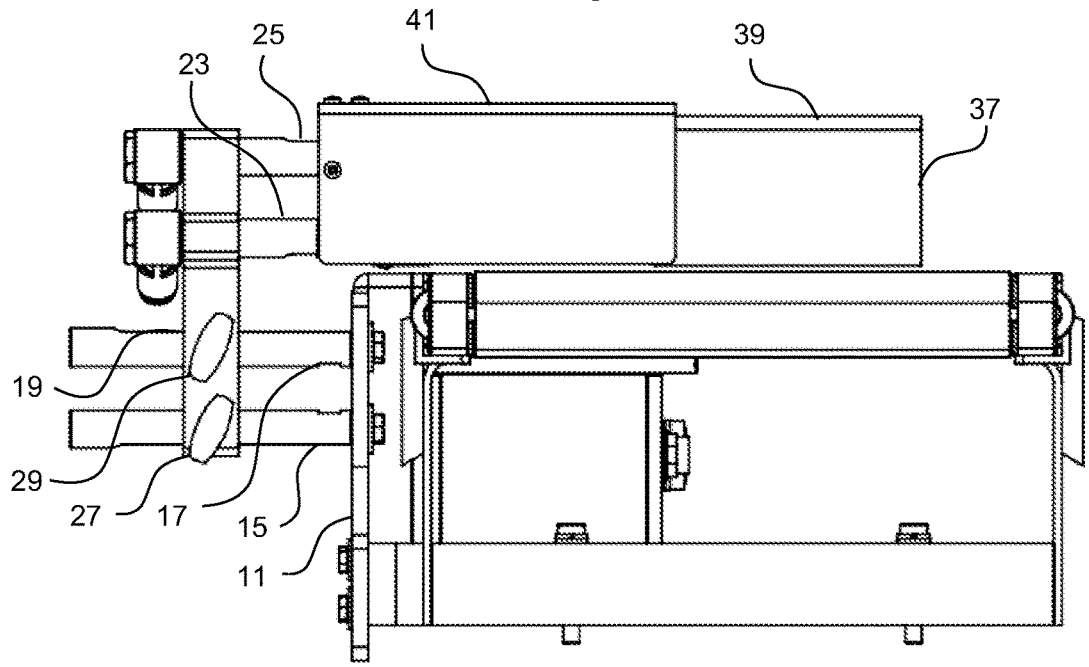
FIG. 6 shows a left side view of a belt conveyor as in FIG. 5.

The pusher plate 37 can extend into the maximally extended end position shown in FIGS. 5 and 6 in the second base position of the pusher 3 or its base body 5 in order to sort products transported on the belt 7. Because of the impulse, products to be diverted are pushed over the edge of the belt 7 and the edge of the belt conveyor 1 and, for example, caught in a collecting vessel.

A stroke movement up to the edge of the belt conveyor 1 is not necessary for this because of the generated impulse of the short stroke pusher 3.

Figure 7:
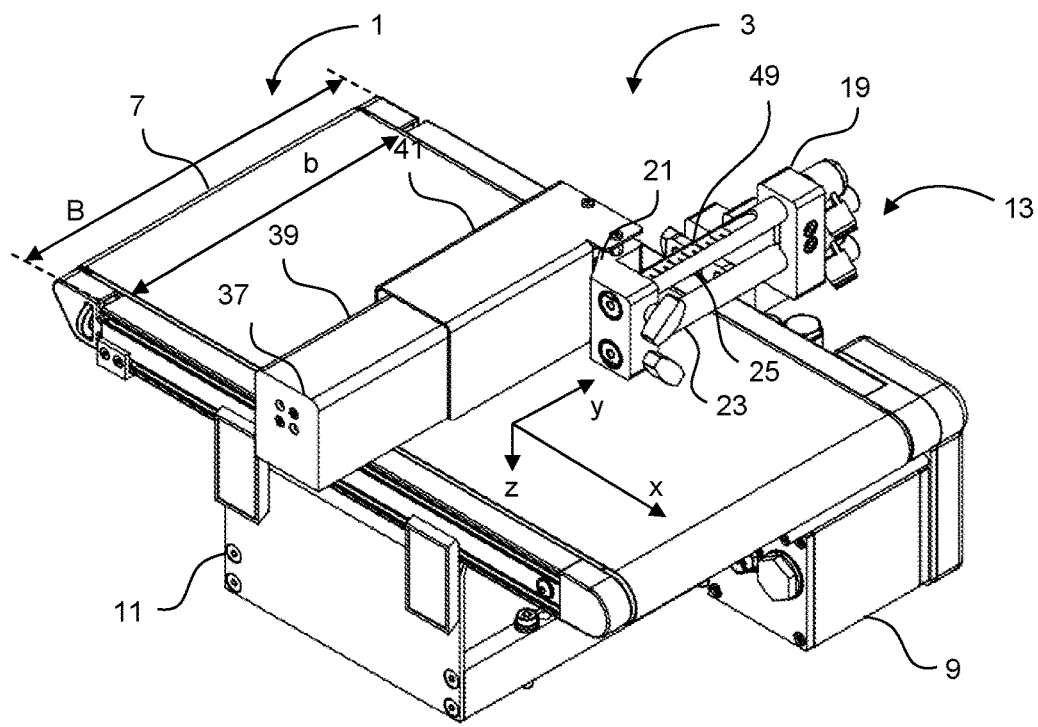
FIG. 7 shows a perspective front view of the belt conveyor according to the invention with an ejector in a third base position with an ejector with an extended end region.
Figure 8:
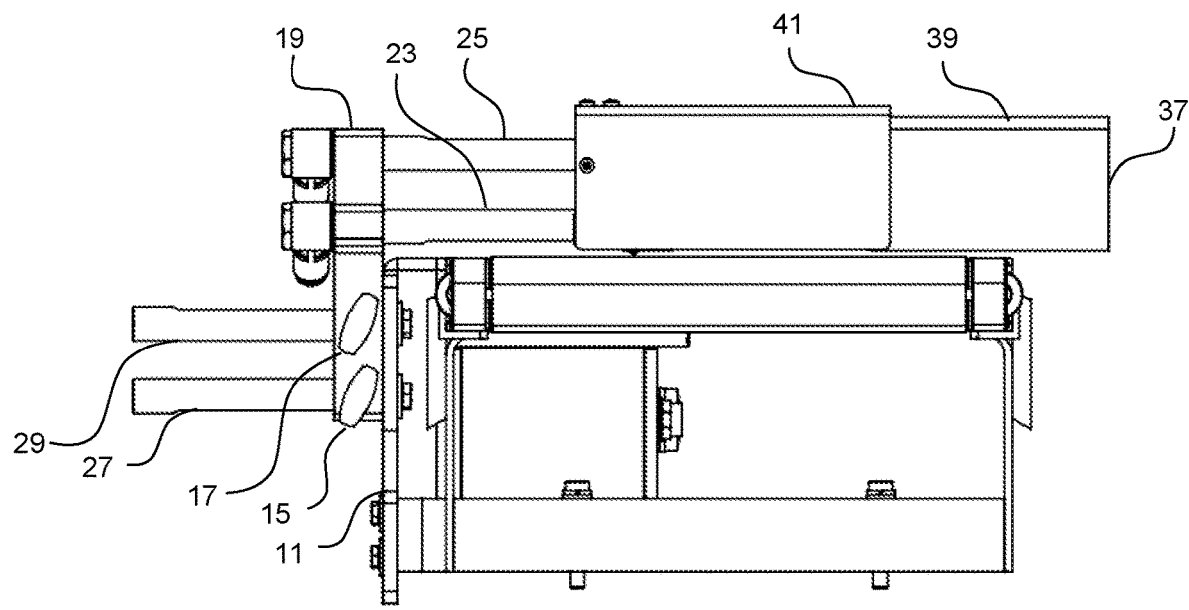
FIG. 8 shows a left side view of the belt conveyor as in FIG. 7.

In the third base position, which is shown in FIGS. 7 and 8, the pusher 3, in contrast, is situated so far within the belt conveyor 3 that the pusher plate 37 in the unactuated state (not shown in the drawing) already projects up to two-thirds of the width B of the belt conveyor 3 (and width b of the belt 7) in the y direction.

In this third position, which is shown in FIGS. 7 and 8, the adjusting elements 19 and 21 are each in their maximally forward (or rightward in FIG. 8) end position of their scales or their adjustment range.

The pusher plate 37 projects beyond the edge of the belt conveyor 1 in the maximally extended end position, which is shown in FIGS. 7 and 8.

The different end positions that are shown illustrate, as examples, how an ejector, in particular a short stroke pusher 3, can be adjusted inward into the belt in the y direction by means of a preferably at least two-stage adjusting device 13 in order to more efficiently sort products in a product flow that does not fill the entire belt with b.

If no products are being transported in an (edge) region of the belt 7, according to the invention, an ejector can be shifted in its position across the belt in the direction of the products. In this (new) position, the unactuated end region then extends on the belt up to the actual product flow (over the belt edge). In this way, the travel path (stroke) of a general sorter or its end region is reduced. Correspondingly, it also becomes possible to use a short stroke pusher with advantageously low length in the y direction. In each case, the reaction time (ejection operation) according to the invention can be reduced, so that a higher throughput is enabled.

As a consequence of the short required stroke, moreover, the pressure in the case of a pneumatic pusher can be reduced, so that the noise generated also becomes clearly reduced.

As can be seen from FIGS. 1, 3, 5, and 7, the guide cylinders 23 and 25 are designed as hollow cylinders. These cylinders 23 and 25 can correspondingly serve individually or together as air blast nozzles 43 and 45 in order to blow products from belt 7, or belt conveyor 1. Such clearing of the belt is often necessary when a machine or an operating process begins in order to remove all products still present in a production section, preferably by a constant air flow.

Since the third and fourth guide cylinders 23, 25 are designed as air blast nozzles, their positions can likewise be adjusted or positioned in the y direction as desired by means of the first adjusting element 19.

Figure 10:
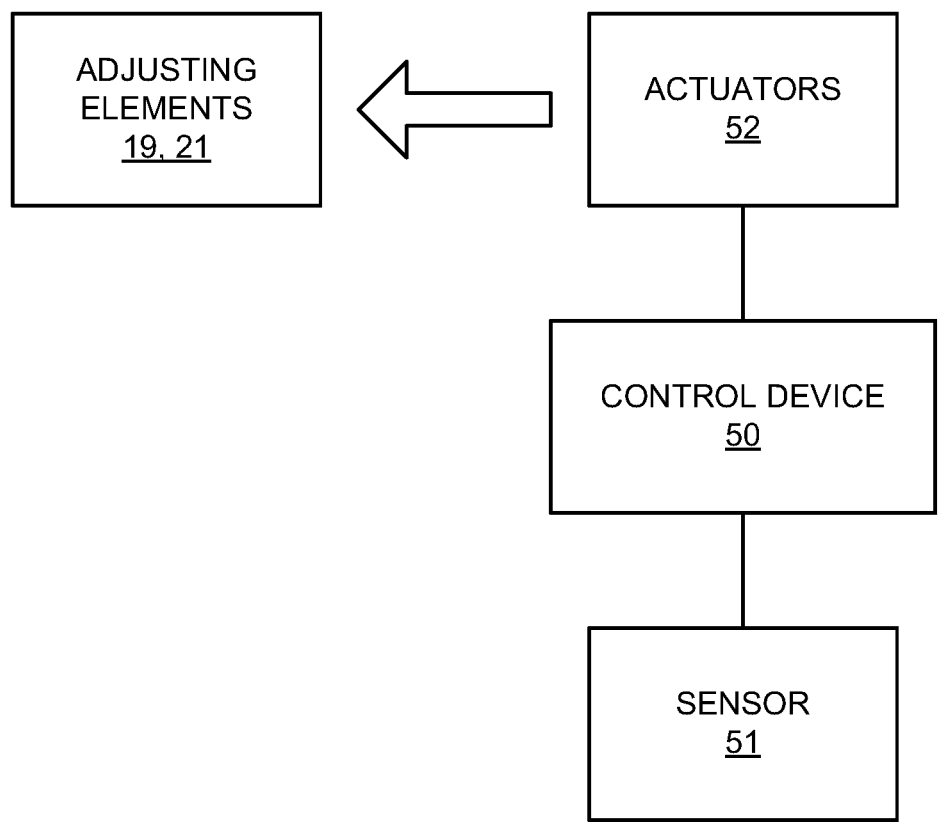
FIG. 10 shows a block diagram of a control arrangement which may be included in embodiments of the present invention.

The adjustment of the base position of the base body 5 can also take place automatically, instead of manually as indicated in the embodiment example. Instead of a manual shifting and securing by means of bolts 27, 29, 31, 33, the adjusting elements 19 and 21 can also be adjusted by means of actuators (piston/cylinder-type actuators, servo motors, etc.), operatively connected to the guide cylinders. For example, desired base positions can automatically be set by means of a control device, wherein predefined positions stored in a memory can also be retrieved for this. The block diagram of FIG. 10 shows such a control device 50 operatively connected to control actuators 52 which are operable to control the position of adjusting elements 19 and 21.

In another embodiment, it is even conceivable that the actual (current) width of the production flow is recorded via an appropriate sensor device (shown in FIG. 10 as sensor 51), for example photoelectric barrier(s), proximity sensor, or camera, and the ejector, in particular the short stroke pusher 3 or its base body 5, can be adjusted to a base position (determined by means of an evaluation unit). This kind of adjustment of the base position can take place for each individual product or for a group or batch of products.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE CHARACTERS

1 Belt conveyor
3 Short stroke pusher
5 Base body
7 Belt
9 Motor
11 Frame
13 Adjusting device
15 First guide cylinder
17 Second guide cylinder
19 First adjusting element
21 Second adjusting element
23 Third hollow guide cylinder
25 Fourth hollow guide cylinder
27 Bolts (wing bolt)
29 Bolt (wing bolt)
31 Bolt (wing bolt)
33 Bolt (wing bolt)
37 Pusher plate (End Region)
39 First protective cover
41 Second protective cover
43 Lower air blast nozzle
45 Upper air blast nozzle
47 First scale
49 Second scale
B Width of belt conveyor
b Width of belt 7 (belt width)
x Transport direction
Y Transverse direction
z Height direction

The invention claimed is:
1. An apparatus including:
  (a) a conveyor defining a transport direction, a conveyor width extending in a transverse direction orthogonal to the transport direction, and a height direction orthogonal to the transport direction and transverse direction;
  (b) a mounting bracket connected to the conveyor;
  (c) an ejector operable for acting in the transverse direction for ejecting products from the conveyor, the ejector having an end region facing in the transverse direction and having a base body supported in a base position relative to the conveyor by the mounting bracket, the base body having a length in the transverse direction which is less than the conveyor width;
  (d) an adjusting device included in the mounting bracket, the adjusting device being operable for adjusting the base position of the base body in the transverse direction within an adjustment range between a minimum extension position and a maximum extension position, wherein, when the base position of the base body is in the maximum extension position and the ejector is in an unactuated state, the end region projects across the conveyor in the transverse direction by at least half of the conveyor width; and
  (e) wherein the adjusting device includes at least one hollow guide cylinder extending in the transverse direction and having an air blast nozzle facing in the transverse direction.

2. The apparatus of claim 1 wherein, when the base position of the base body is in the maximum extension position and the ejector is in the unactuated state, the end region projects across the conveyor in the transverse direction by at least two-thirds of the conveyor width.

3. The apparatus of claim 1 wherein, when the base position of the base body is in the maximum extension position and the ejector is in an unactuated state, the end region projects across the entire conveyor width.

4. The apparatus of claim 1 wherein the adjusting device includes a first stage having a first adjustment length and a second stage having a second adjustment length wherein the first adjustment length and the second adjustment length add together to the adjustment range.

5. The apparatus of claim 1 wherein the adjusting device includes:
   (a) a first adjustment element positionable along a first adjusting path having a first adjustment length; and
   (b) a second adjustment element positionable along a second adjusting path having a second adjustment length, the second adjusting path running parallel to the first adjusting path so that the first adjustment length and second adjustment length add together to form the adjustment range.

6. The apparatus of claim 1 wherein the ejector comprises a pusher, a stroke sorter, or an air blast device.

7. The apparatus of claim 1 wherein the ejector comprises a short stroke pusher.

8. The apparatus of claim 7 wherein the short stroke pusher has a design stroke that maximally does not exceed three-fourths of a width dimension of a transport surface of the conveyor in the transverse direction.

9. The apparatus of claim 1 wherein the adjusting device includes a position device operable for quantifying the base position along the adjustment range.

10. The apparatus of claim 9 further including a control device for automatically setting, checking, determining, or displaying the base position along the adjustment range.

11. The apparatus of claim 1 further including a control arrangement operable to move the base position of the base body from a first location along the adjustment range to a second location along the adjustment range in response to a change of product input.

12. The apparatus of claim 11 wherein the control arrangement includes a sensor device for detecting a product position on the conveyor and the control arrangement moves the base position of the base body from the first location to the second location in dependence on the product position detected by the sensor device.

13. An apparatus for use with a conveyor defining a transport direction, a conveyor width extending in a transverse direction orthogonal to the transport direction, and a height direction orthogonal to the transport direction and transverse direction, the apparatus including:
   (a) a mounting bracket adapted to be connected on the conveyor in a bracket position;
   (b) an ejector having a base body connected to the mounting bracket and residing in a base position relative to the conveyor when the mounting bracket is connected to the conveyor in the bracket position, the ejector in the base position having an end region facing in the transverse direction and being operable for acting in the transverse direction for ejecting products from the conveyor, the base body having a length in the transverse direction which is less than the conveyor width;
   (c) an adjusting device included in the mounting bracket, wherein when the mounting bracket is in the bracket position the adjusting device is operable for adjusting the base position of the base body in the transverse direction within an adjustment range between a minimum extension position and a maximum extension position, wherein, when the base position of the base body is in the maximum extension position and the ejector is in an unactuated state, the end region projects across the conveyor in the transverse direction by at least half of the conveyor width; and
   (d) wherein the adjusting device includes at least one hollow guide cylinder extending in the transverse direction and having an air blast nozzle facing in the transverse direction.

14. The apparatus of claim 13 wherein, when the mounting bracket is in the bracket position, the base position of the base body is in the maximum extension position, and the ejector is in the unactuated state, the end region projects across the conveyor in the transverse direction by at least two-thirds of the conveyor width.

15. The apparatus of claim 13 wherein, when the mounting bracket is in the bracket position, the base position of the base body is in the maximum extension position, and the ejector is in an unactuated state, the end region projects across the entire conveyor width.

16. The apparatus of claim 13 wherein the adjusting device includes:
   (a) a first adjustment element positionable along a first adjusting path having a first adjustment length; and
   (b) a second adjustment element positionable along a second adjusting path having a second adjustment length, the second adjusting path running parallel to the first adjusting path so that the first adjustment length and second adjustment length add together to form the adjustment range.

17. The apparatus of claim 13 wherein the adjusting device includes a position device operable for quantifying the base position along the adjustment range.

18. An apparatus including:
   (a) a conveyor defining a transport direction, a conveyor width extending in a transverse direction orthogonal to the transport direction, and a height direction orthogonal to the transport direction and transverse direction;
   (b) a mounting bracket connected to the conveyor;
   (c) an ejector operable for acting in the transverse direction for ejecting products from the conveyor, the ejector having an end region facing in the transverse direction and having a base body supported in a base position relative to the conveyor by the mounting bracket, the base body having a length in the transverse direction which is less than the conveyor width;
   (d) an adjusting device included in the mounting bracket, the adjusting device being operable for adjusting the base position of the base body in the transverse direction within an adjustment range between a minimum extension position and a maximum extension position, wherein, when the base position of the base body is in the maximum extension position and the ejector is in an unactuated state, the end region projects across the conveyor in the transverse direction by at least half of the conveyor width; and
   (e) a control arrangement operable to move the base position of the base body from a first location along the adjustment range to a second location along the adjustment range in response to a change of product input, wherein the control arrangement includes a sensor device for detecting a product position on the conveyor and the control arrangement moves the base position of the base body from the first location to the second location in dependence on the product position detected by the sensor device.

\* \* \* \* \*